(12) United States Patent
Wells et al.

(10) Patent No.: US 11,225,779 B2
(45) Date of Patent: Jan. 18, 2022

(54) RETAINER SLEEVE

(71) Applicant: Caterpillar Inc., Deerfield, IL (US)

(72) Inventors: Corey Wells, Peoria, IL (US); Jason Jura, Peoria, IL (US); Eric Sinn, Tremont, IL (US); Doug Serrurier, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 409 days.

(21) Appl. No.: 16/430,228

(22) Filed: Jun. 3, 2019

(65) Prior Publication Data

US 2020/0378093 A1    Dec. 3, 2020

(51) Int. Cl.
*E02F 9/28*     (2006.01)

(52) U.S. Cl.
CPC .......... *E02F 9/2841* (2013.01); *E02F 9/2808* (2013.01); *E02F 9/2825* (2013.01)

(58) Field of Classification Search
CPC ..... E02F 9/2833; E02F 9/2841; E02F 9/2816; E02F 9/2808; E02F 9/2825; E02F 9/285; E02F 9/2858; F16B 21/18; E21C 35/197
See application file for complete search history.

(56) References Cited

U.S. PATENT DOCUMENTS

| | | | | |
|---|---|---|---|---|
| 3,233,497 A * | 2/1966 | McCormick | ............ | F16B 21/18 411/517 |
| 3,400,476 A | 9/1968 | Petersen | | |
| 3,483,888 A * | 12/1969 | Wurzelhugo | ......... | F16K 15/046 137/539 |
| 3,527,120 A * | 9/1970 | Duer | ......................... | F16D 1/08 475/235 |
| 3,754,802 A * | 8/1973 | Keller | .................... | F16C 23/045 384/203 |
| 3,767,266 A * | 10/1973 | Krekeler | ............... | E21C 35/197 299/107 |
| 4,006,659 A * | 2/1977 | Wurzel | .................... | F16B 21/18 411/518 |
| 4,611,417 A * | 9/1986 | Carlson | ................. | E02F 9/2816 299/108 |
| 4,716,668 A * | 1/1988 | Hahn | .................... | E02F 9/2841 267/182 |
| 4,727,663 A * | 3/1988 | Hahn | .................... | E02F 9/2841 37/458 |
| 4,924,127 A * | 5/1990 | Boireau | ................. | F16C 23/045 310/89 |
| 4,981,390 A * | 1/1991 | Cramer, Jr. | ............ | F16D 1/0835 403/355 |
| 5,087,847 A * | 2/1992 | Giesbert | ................... | F02M 3/07 267/161 |

(Continued)

FOREIGN PATENT DOCUMENTS

| | | |
|---|---|---|
| GB | 2490455 B | 10/2012 |
| WO | 2007025687 A1 | 3/2007 |
| WO | 2008021376 | 2/2008 |

*Primary Examiner* — Jamie L McGowan
(74) *Attorney, Agent, or Firm* — Procopio, Cory, Hargreaves & Savitch LLP

(57) ABSTRACT

A retainer sleeve for use with a lock in a ground engaging tool. The retainer sleeve can include a skirt extending part way around a retainer axis. The retainer sleeve can further include a plurality of legs joined to the skirt and formed to mate with a lock cavity of the ground engaging tool. The skirt can form an inner surface shaped to rotatably receive an outer surface of the lock.

20 Claims, 6 Drawing Sheets

(56) References Cited

U.S. PATENT DOCUMENTS

| | | | | |
|---|---|---|---|---|
| 5,261,650 A * | 11/1993 | Hein | ............. | B60G 15/068 |
| | | | | 267/153 |
| 5,567,998 A * | 10/1996 | Ineson | ............. | H02K 7/06 |
| | | | | 310/90 |
| 5,931,585 A * | 8/1999 | Malchow | ............. | F16C 35/045 |
| | | | | 384/535 |
| 6,318,900 B1 * | 11/2001 | Bere | ............. | F16C 25/08 |
| | | | | 384/535 |
| 7,670,079 B2 * | 3/2010 | Snadden | ............. | F16C 27/04 |
| | | | | 403/372 |
| 8,834,031 B2 * | 9/2014 | Korn | ............. | F16C 35/02 |
| | | | | 384/296 |
| 9,074,351 B2 | 7/2015 | Ballinger | | |
| 9,328,484 B2 | 5/2016 | Campomanes | | |
| 2007/0092852 A1 * | 4/2007 | Bars | ............. | F16B 43/00 |
| | | | | 433/173 |
| 2008/0148608 A1 * | 6/2008 | Harder | ............. | E02F 9/2833 |
| | | | | 37/455 |
| 2015/0021139 A1 * | 1/2015 | Ari | ............. | F16F 15/12373 |
| | | | | 192/213.2 |
| 2016/0153178 A1 | 6/2016 | Amstutz | | |
| 2017/0328037 A1 * | 11/2017 | Serrurier | ............. | E02F 9/2841 |
| 2018/0320742 A1 * | 11/2018 | Hopson | ............. | F16B 21/18 |
| 2020/0378092 A1 * | 12/2020 | Wells | ............. | E02F 9/2841 |

\* cited by examiner

RETAINER SLEEVE

TECHNICAL FIELD

The present disclosure generally pertains to ground engaging tools. More particularly this application is directed toward a retainer sleeve.

BACKGROUND

Earth-working machines, such as, for example, excavators, wheel loaders, hydraulic mining shovels, cable shovels, bucket wheels, bulldozers, and draglines, are generally used for digging or ripping into the earth or rock and/or moving loosened work material from one place to another at a worksite. These earth-working machines include various earth-working implements, such as a bucket or a blade, for excavating or moving the work material. These implements can be subjected to extreme wear from the abrasion and impacts experienced during the earth-working applications.

To protect these implements against wear, and thereby prolong the useful life of the implements, various ground engaging tools, such as teeth, edge protectors, and other wear members, can be provided to the earth-working implements in the areas where the most damaging abrasions and impacts occur. These ground engaging tools are removably attached to the implements using customized retainer systems, so that worn or damaged ground engaging tools can be readily removed and replaced with new ground engaging tools.

Many retainer systems have been proposed and used for removably attaching various ground engaging tools to earth-working implements. One example of such retainer system is described in U.S. Publication Number 2017/0328037 to Serrurier et al. The disclosed retainer system includes a retainer sleeve configured for use in a retainer system for a ground engaging tool includes a plurality of plate-like sections, each section being flexibly joined with an adjacent section along either a radially inner edge or a portion of a radially outer edge. The radially inner edges of the plurality of sections form part of a segmented inner surface configured for engagement with an outer surface of a locking member of the retainer system. The inner surface extends partially around a central axis of the retainer sleeve to form a substantially C-shaped retainer sleeve having opposite circumferential ends that are spaced from each other. The radially outer edges of the plurality of sections form part of a segmented, frustoconical outer surface configured for engagement in an internal lock cavity of a ground engaging tool tip.

The present disclosure is directed toward overcoming one or more of the problems discovered by the inventors.

SUMMARY

A retainer sleeve for use with a lock in a ground engaging tool with a lock cavity, the lock having an outer surface and a detent recess is disclosed herein. The retainer sleeve comprising a skirt extending part way around a retainer axis and forming an inner surface shaped to rotatably receive the outer surface of the lock. The skirt includes a first plate, a second plate located proximate to the first plate, a center bend circumferentially extending between the first plate and second plate with respect to the retainer axis. The retainer sleeve further includes a first leg joined to the first plate, extending away from the retainer axis, and formed to mate with the lock cavity of the ground engaging tool. The retainer sleeve further includes a second leg joined to the second plate, extending away from the retainer axis, and formed to mate with the lock cavity of the ground engaging tool.

BRIEF DESCRIPTION OF THE FIGURES

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent that those skilled in the art will be able to understand the disclosure without these specific details. In some instances, well-known structures and components are shown in simplified form for brevity of description. Some of the surfaces have been left out or exaggerated for clarity and ease of explanation.

Figure 1:
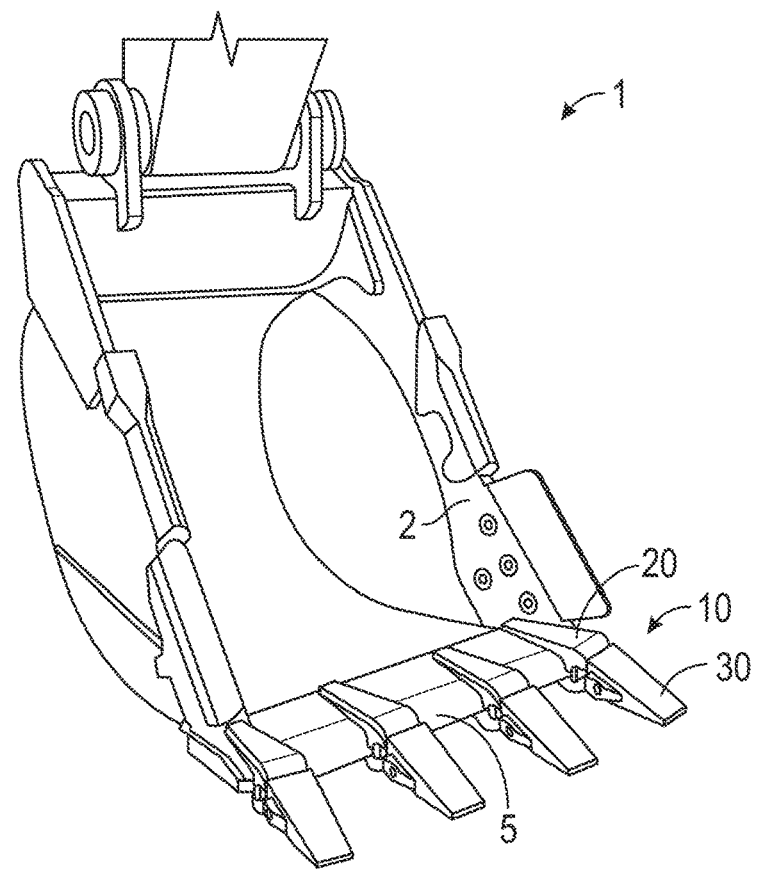
FIG. 1 is a perspective view of a loader bucket having a plurality of ground engaging tools attached thereto according to an exemplary embodiment.

FIG. 1 is a perspective view of a loader bucket having a plurality of ground engaging tools attached thereto according to an exemplary embodiment. FIG. 1 illustrates an excavator bucket assembly 1 as an exemplary implement of an earth-working machine. Excavator bucket assembly 1 includes a bucket 2 used for excavating work material in a known manner. Bucket 2 may include a variety of ground engaging tools. For example, bucket 2 may include a plurality of tooth assemblies 10, as ground engaging tools, attached to a base edge 5 of bucket 2. Tooth assemblies 10 may be secured to bucket 2 employing retainer systems according to the present disclosure. While various embodiments of the present disclosure will be described in connection with a particular ground engaging tool (e.g., tooth assembly 10), it should be understood that the present disclosure may be applied to, or used in connection with, any other type of ground engaging tools or components. Further, it should be understood that one or more features described in connection with one embodiment can be implemented in any of the other disclosed embodiments unless otherwise specifically noted.

Figure 2:
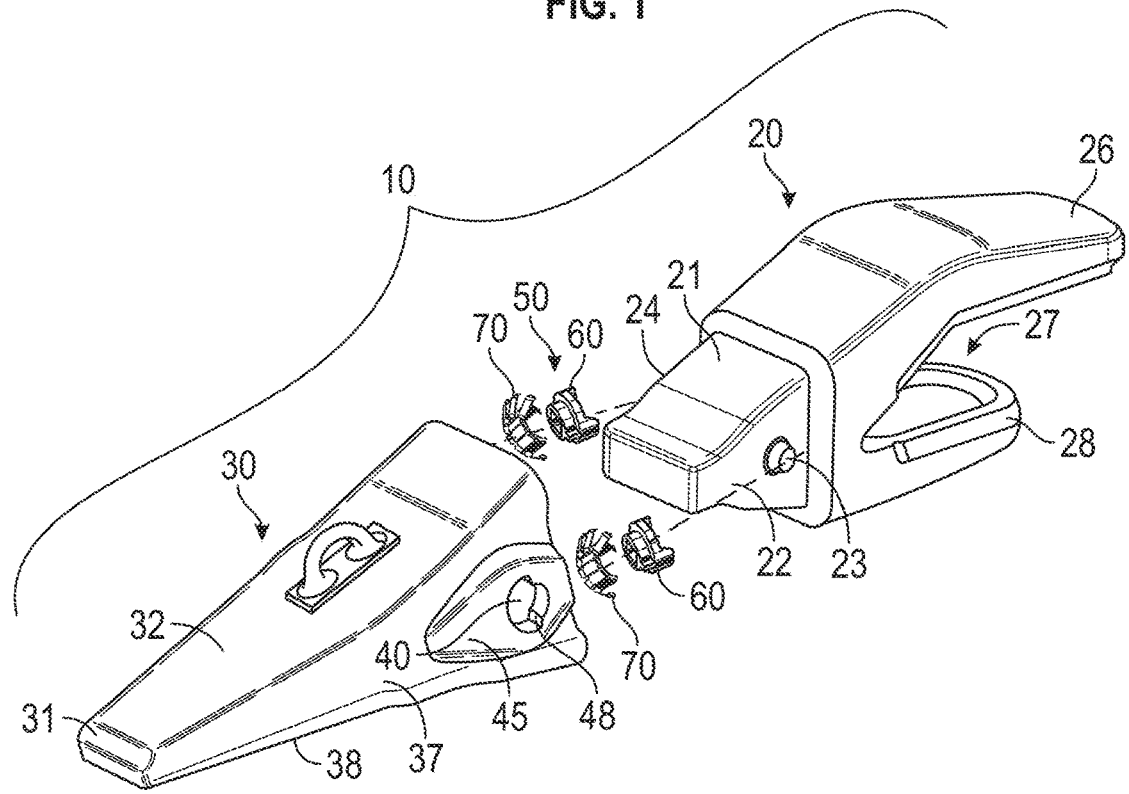
FIG. 2 is an exploded perspective view of a tooth assembly according to an exemplary embodiment.

FIG. 2 is an exploded perspective view of a tooth assembly according to an exemplary embodiment. The tooth assembly 10 may include an adapter 20 configured to engage base edge 5 of bucket 2 or other suitable support structure of an implement. Tooth assembly 10 may also include a ground-engaging tip, or tip, 30 formed to be removably attached to adapter 20. Tooth assembly 10 may further include a retainer system 50 formed to secure tip 30 to adapter 20. Tip 30 endures the majority of the impact and abrasion caused by engagement with work material, and wears down more quickly and breaks more frequently than adapter 20. Consequently, multiple tips 30 may be attached to adapter 20, worn down, and replaced before adapter 20 itself needs to be replaced. As will be detailed herein, various exemplary embodiments of retainer system 50, consistent with the present disclosure, may facilitate attachment and detachment of ground engaging tools and tips 30 to and from the adapter 20 attached to an implement.

Adapter 20 may include a pair of first and second mounting legs 26, 28 defining a recess 27 there between for receiving base edge 5. Adapter 20 may be secured in place on base edge 5 by attaching first mounting leg 26 and second mounting leg 28 to base edge 5 using any suitable connection method. For example, mounting legs 26 and 28 and base edge 5 may have corresponding apertures (not shown) through which any suitable fasteners such as bolts or rivets may be inserted to hold adapter 20 in place. Alternatively or additionally, mounting legs 26 and 28 may be welded to the corresponding top and bottom surfaces of base edge 5. Any other connection method and/or configuration known in the art may be used alternatively or additionally. For example, in some exemplary embodiments, an adapter 20 may be configured to use any of the retainer systems 50 disclosed herein to secure the adapter 20 to a ground engaging tip 30.

The adapter 20 may include a nose 21 extending in a forward direction. Nose 21 may be configured to be received in a mounting cavity 35 (shown in FIG. 3) of tip 30. Nose 21 may be configured to support tip 30 during use of bucket 2 and to facilitate retention of tip 30 on nose 21 when bearing the load of the work material.

Nose 21 may include an integral post 23 extending from each lateral side 22, 24. Post 23 may have various shapes and sizes. In one exemplary embodiment, as shown in FIG. 2, post 23 may have a frustoconical shape. As will be described in more detail herein, posts 23 may cooperate with retainer system 50 to secure tip 30 to adapter 20.

Figure 3:
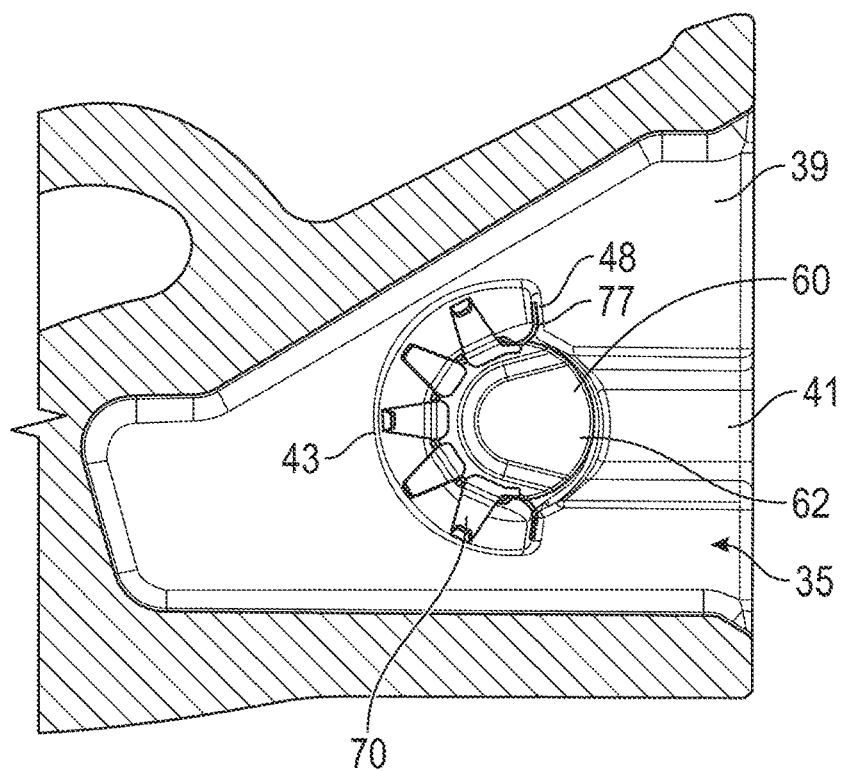
FIG. 3 is a cross section of a portion of the tip of the tooth assembly shown in FIG. 2, with a lock and a retainer sleeve positioned in a lock cavity of the tip.

FIG. 3 is a cross section of a portion of the tip of the tooth assembly shown in FIG. 2, with a lock and a retainer sleeve positioned in a lock cavity of the tip. Tip 30 may define mounting cavity 35 inside tip 30 having a complementary configuration relative to nose 21 of adapter 20. Tip 30 may have various outer shapes.

For example, looking back at FIG. 2, tip 30 may generally taper as it extends forward. For example, an upper surface 32 of tip 30 may slope downward as it extends forward, and a lower surface 38 of tip 30 may extend generally upward as it extends forward. Alternatively, lower surface 38 may extend generally straight or downward as it extends forward. At its forward end, tip 30 may have a wedge-shaped edge 31.

Referring to FIG. 2, tip 30 may be secured to adapter 20 via retainer system 50. Retainer system 50 may include a lock 60 and a retainer sleeve 70. Tip 30 and/or adapter 20 may have various configurations for accommodating lock 60 and retainer sleeve 70 therein. For example, in the exemplary embodiment shown in FIGS. 2 and 3, tip 30 may include a lock cavity 40 in each of its lateral sides 37 for housing the lock 60 and retainer sleeve 70. Lock 60 and retainer sleeve 70 may be seated within lock cavity 40 when assembled to tip 30. Tip 30 may also include a lock bulge 45 extending outward of each lock cavity 40. While the exemplary embodiment shown in FIG. 2 has lock cavity 40 and lock bulge 45 on each lateral side 37 of tip 30, tip 30 may have different numbers and/or arrangements of lock cavities 40 and lock bulges 45.

Figure 4:
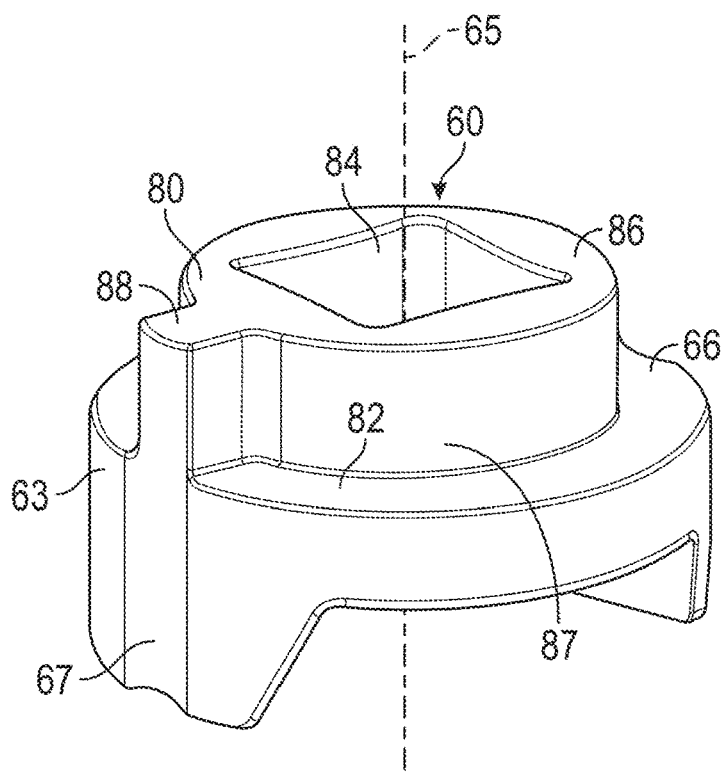
FIG. 4 is a perspective view of the lock of the retainer system from FIG. 2.

FIG. 4 is a perspective view of the lock of the retainer system from FIG. 2. The lock 60 can include lock skirt 63 with an outer surface 66 that may be extend circumferentially around and concentric with lock rotation axis 65. The lock skirt 63 can be substantially cylindrically shaped or conically shaped. The lock skirt 63 can have a detent recess 67 that may extend radially inward from outer surface 66 of lock skirt 63. Detent recesses 67 may include a concave surface, such as a constant-radius curved surface, extending radially inward from outer surface 66.

Lock 60 may also include a head portion 80 attached to lock skirt 63 adjacent an end of lock skirt 63. The head portion 80 may include a wall 82 extending in a plane substantially perpendicular to lock rotation axis 65 and across the end of lock skirt 63 adjacent to the head portion 80. The head portion 80 can include a projection 86 extending from wall 82 away from lock skirt 63 along lock rotation axis 65. Projection 86 may include a substantially cylindrical outer surface 87 extending around most of lock rotation axis 65 and a lock tab 88 extending radially outward relative to lock rotation axis 65.

Lock 60 may also include a tool interface 84 in head portion 80 to facilitate rotating lock 60 about lock rotation axis 65. Tool interface 84 may include any type of features formed to be engaged by a tool for applying torque to lock 60 about lock rotation axis 65. For example, tool interface 84 may include a socket recess with a cross-section formed to engage a socket driver, such as a socket wrench. When lock 60 is seated within lock cavity 40, head portion 80 defining tool interface 84 may extend at least partially through lock cavity 40 and lock bulges 45, and lock cavity 40 may provide an access opening for a tool to engage tool interface 84.

Figure 5:
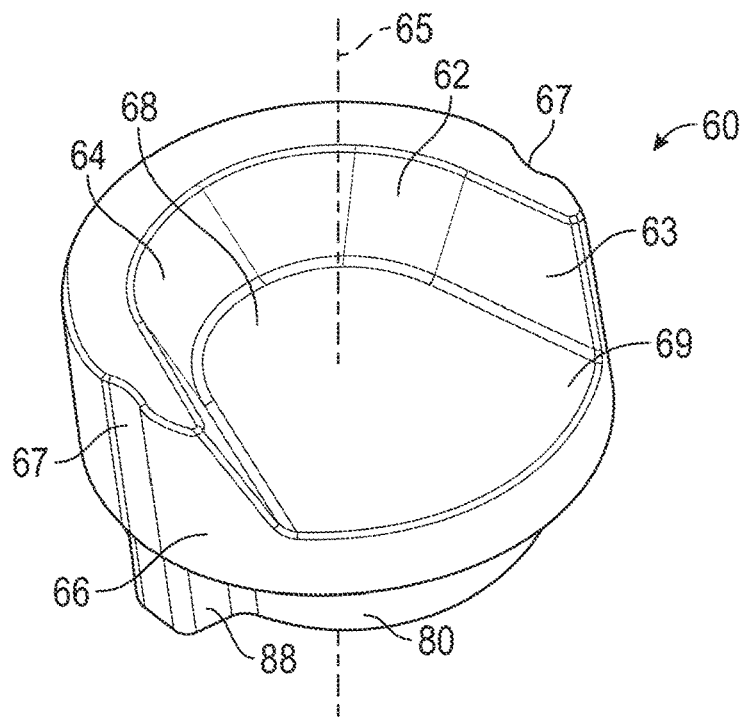
FIG. 5 is a perspective view of the lock shown in FIG. 4.

FIG. 5 is a perspective view of the lock shown in FIG. 4. Lock 60 may be formed to receive at least part of post 23 of adapter 20. Lock 60 may include a lock slot 62 extending into lock skirt 63. Lock slot 62 may have an open end 69 between two circumferential ends of lock skirt 63 and a closed end 68 adjacent a middle portion of lock skirt 63. In some embodiments, lock slot 62 may have a size and shape such that it can receive frustoconical post 23 of adapter 20. An inner surface 64 of lock skirt 63 may be sloped so as to mate with frustoconical post 23 of adapter 20 adjacent closed end 68 of lock slot 62.

In some embodiments, wall 82 may fully enclose the side of lock slot 62 adjacent the head portion 80. The side of head portion 80 opposite lock slot 62 may include a projection 86 extending from wall 82 away from lock skirt 63 along lock rotation axis 65. In some exemplary embodiments, lock tab 88 may extend transverse relative to the direction that lock slot 62 extends from open end 69 to closed end 68.

Referring back to FIG. 3, lock 60 and retainer sleeve 70 may be formed to seat within an inner surface 43 of lock cavity 40 in a manner allowing lock 60 to rotate at least partially around a lock rotation axis 65 (FIGS. 4 and 5) relative to retainer sleeve 70. Retainer sleeve 70 may seat directly against inner surface 43 of lock cavity 40, and lock 60 may seat against inner surface 79 (shown in FIG. 6) of retainer sleeve 70. On the rear side of lock cavity 40, lock cavity 40 may open into a side slot 41 that extends rearward from lock cavity 40 along an inner surface 39 of lateral side 37. Side slot 41 may have a cross-section configured to allow passage of at least a portion of post 23 of adapter 20 being inserted from the rear end of tip 30.

Figure 6:
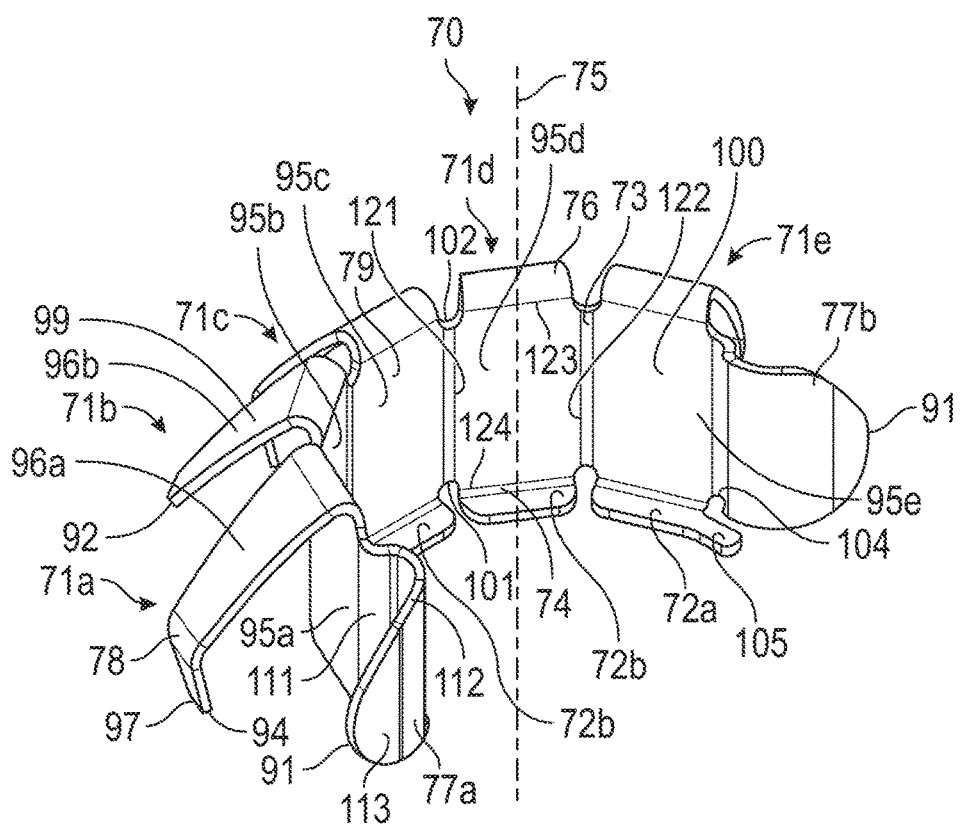
FIG. 6 is a perspective view of the retainer sleeve of the retainer system from FIG. 2.

FIG. 6 is perspective view of the retainer sleeve 70 from FIG. 2. Several of the elements shown are commonly shared elements and to improve the clarity and readability some of the reference numbers are not shown here and in other figures. Retainer sleeve 70 can be generally "C" shaped. It can include a skirt 100 extending along the entire C which is circumferentially around and concentric with retainer axis 75. Accordingly, skirt 100 may extend circumferentially around and concentric with lock rotation axis 65 (shown in FIG. 5) when retainer sleeve 70 is assembled with lock 60 in lock cavity 40. The skirt 100 may form a continuous "C" shape that extends part way around a retainer axis 75. The skirt 100 may extend 180 degrees or more around the retainer axis 75. In some exemplary embodiments, skirt 100 may extend approximately the same angular degree around retainer axis 75 as inner surface 43 of lock cavity 40 extends around lock rotation axis 65. The skirt 100 can be formed to receive the lock 60.

The skirt 100 can include a plurality of plates 95a, b, c, d, e. The plurality of plates 95a-e can include a first plate 95a, a second plate 95b, a third plate 95c, a fourth plate 95d, and a fifth plate 95e. In an embodiment there are five plates 95a-e. However, there can be one, two, three, four, five, six, seven, eight, nine or more plates 95a-e.

Each plate of the plurality of plates 95a-e can be substantially parallel to the retainer axis 75. Additionally, each plate of the plurality of plates 95a-e can be angled toward the retainer axis 75 or away from the retainer axis 75. The plurality of plates 95a-e may form the inner surface 79 (shown pointing to the third plate 95c) or form a portion of the inner surface 79. Each of the plurality of plates 95a-e can have a flat shape and can be generally rectangular. Alternatively, each of the plurality of plates 95a-e can have a curved shape.

The second plate 95b can be disposed proximate to the first plate 95a. The third plate 95c can be disposed proximate the second plate 95b. The fourth plate 95d can be disposed proximate to the third plate 95c. The fifth plate 95e can be disposed proximate the fourth plate 95d.

In an embodiment, the fourth plate 95d includes a first side 121, a second side 122, a top end 123, and a bottom end 124 that form the sides of a generally rectangular shape of the fourth plate 95d. Though not shown for clarity, the first plate 95a, second plate 95b, third plate 95c, and fifth plate 95e can each have a first side 121, second side 122, top end 123, and bottom end 124. The descriptions directed at the first side 121, second side 122, top end 123, and bottom end 124 for the fourth plate 95d can be similarly used for the descriptions of the first side 121, second side 122, top end 123, and bottom end 124 for the first plate 95a, second plate, 95b, third plate 95c, and fifth plate 95e.

In an embodiment, the second side 122 can be disposed opposite from the first side 121. The top end 123 and bottom end 124 can be positioned generally perpendicular to the first side 121 and second side 122. The bottom end 124 can be disposed opposite from the top end 123.

The plurality of plates 95a-e can be joined together and formed to be generally C shaped. For example, the first side 121 of the second plate 95b can extend from the second side 122 of the first plate 95a. The plurality of plates 95a-e can each be joined by a center bend 73 (only shown between the fourth plate 95d and the fifth plate 95e for clarity). The center bend 73 can circumferentially extended between at least one of the plurality of plates 95a-e to another of the plurality of plates 95a-e. The center bend 73 can be generally curved and extend generally parallel with the plurality of plates 95a-e and the retainer axis 75.

The skirt 100 can include a lower recess 101 (only shown between the third plate 95c and the fourth plate 95d for clarity) that forms a concave curvature located adjacent to the bottom end 124 and the center bend 73. The lower recess 101 can form a concave curvature transitioning from the bottom end 124 to the first side 121 and from the bottom end 124 to the second side 122. The lower recess 101 can have a constant curvature. In other examples the lower recess 101 can have varying curvature or have straight edges.

The skirt 100 can include an upper recess 102 (only shown between the third plate 95c and the fourth plate 95d for clarity) that forms a concave curvature located adjacent to the top end 123 and the center bend 73. The upper recess 102 can form a concave curvature transitioning from the top end 123 to the first side 121 and from the top end 123 to the second side 122. The upper recess 102 can have a constant curvature. In other examples the upper recess 102 can have varying curvature or have straight edges. Each of the plurality of plates 95a-e with the lower recesses 101 and the upper recesses 102 can form a shape similar to a "raffle ticket". For example, a rectangle with concave curves at the corners of the rectangle.

In some exemplary embodiments, skirt 100 may include one or more detent projections 77a, b for engaging corresponding detents of lock 60. The skirt 100 may include detent projections 77a, b extending circumferentially from a first plate 95a and a fifth plate 95e. Detent projections 77a, b may be located at various positions on retainer sleeve 70. For example, detent projections 77a, b may be spaced approximately 180 degrees from one another around retainer axis 75 at opposite ends of the "C" shaped retainer sleeve 70.

Detent projections 77a, b may have various shapes. In one exemplary embodiment, each detent projection 77a, b may include a detent first portion 111, a detent second portion 112, and a detent third portion 113 (only shown on 77a in FIG. 6 for clarity). The detent first portion 111 can extend from the first plate 95a or the fifth plate 95e and have a concave shape relative to the retainer axis 75. The detent first portion 111 can have a constant radius and be shaped as a portion of a hollow cylinder. Alternatively the detent first portion 111 can be straight, have a convex shape or may have a varying curvature with multiple radii. The detent first portion 111 can maintain its shape and size along a direction substantially parallel to retainer axis 75.

The detent second portion 112 can extend from the detent first portion 111 have a convex shape relative to the retainer axis 75. The detent second portion 112 can have a constant radius and be shaped as a portion of a hollow cylinder. Alternatively the detent second portion 112 can be straight, have a concave surface or may have a varying curvature with multiple radii.

The detent third portion 113 can extend from the detent second portion 112, opposite from the detent first portion 111. The detent third portion 113 can taper and be wider adjacent the detent second portion 112 than opposite the detent second portion 112. Alternatively the detent third portion 113 can have a concave surface or convex surface with respect to the retainer axis 75 and have a constant curvature or varying curvature. The detent projections 77a, b can include detent ends 91 that are spaced from each other at the circumferential opposite ends of the skirt 110 and are at an ends of the detent third portions 113.

The skirt 100 can include a detent recess 104 (only shown on detent 77b for clarity) that forms a concave curvature located adjacent to the bottom end 124 and the detent projection 77a, b. The detent recess 104 can have a constant curvature. In other examples the detent recess 104 can have varying curvature or have straight edges.

The retainer sleeve 70 can include a first bend 74 (only shown with fourth plate 95d for clarity) extending from each of the bottom ends 124 of the plurality of plates 95a-e. The first bend 74 can flexibly extend inward and be generally transverse from at least one of the plurality of plates 95a-e with respect to the retainer axis 75. The first bend 74 can be shaped to transition from being oriented generally parallel with at least one of the plurality of plates 95a-e to being generally transverse to at least one of the plurality of plates 95a-e.

The retainer sleeve 70 can include a central tab 72b (only shown proximate to the third plate 95c and fourth plate 95d for clarity) extending from at least one of the plurality of plates 95a-e. The central tab 72b can extend from the first bend 74. The central tab 72b can extend generally parallel from first bend 74 inward toward the retainer axis 75. The central tab 72b can have a "D" shape with the straight side joined to the first bend 74 or the bottom end 124 of at least one of the plurality of plate 95a-e and the curved side located opposite of the straight side. The retainer sleeve 70 can include multiple central tabs 72b.

The retainer sleeve 70 can include an end tab 72a (only shown proximate to fifth plate 95e for clarity) or multiple end tabs 72a disposed proximate to one of the detent ends 91 and extending from the first bend 74. The end tab 72a can extend from the bottom end 124 of at least one of the plurality of plates 95a-e.

The end tab 72a can extend generally parallel from first bend 74 inward toward the retainer axis 75. The end tabs 72a can include protrusions 105 that can extend generally parallel and circumferentially away from the central tabs 72b. The protrusions 105 can provide additional engagement with the top surface 63 of the lock 60 while the lock 60 is in the locked position. The central tabs 92b can be positioned circumferentially between the end tabs 72a.

A plurality of legs 71a-e can be flexibly joined at the skirt 100 to at least one of the top ends 123 of the plurality of plates 95a-e. The plurality of legs 71a-e can include a first leg, 71a, a second leg 71b, a third leg 71c, a fourth leg 71d, and a fifth leg 71e. Each of the legs 71a-e can include a second bend 76. In order to improve readability in the figure, the second bend 76 is only labeled on the fourth leg 71d. In an embodiment shown in FIG. 6, the retainer sleeve 70 comprises five legs 71a, 71b, 71c, 71d, 71e. Alternatively, the retainer sleeve 70 can include two, three, four, six, seven, eight, nine, or more legs 71a, 71b, 71c, 71d, 71e.

Each of the legs 71a-e may include outer surface 99 (only labeled on leg 71b) which collectively form a segmented frustoconical surface generally configured into a segmented "C" shape. The legs 71a-e can be formed for engagement in lock cavity 40 of ground engaging tool tip 30. The legs 71a-e can be flexibly joined to the skirt 100 such that the retainer sleeve 70 is compressible for insertion into lock cavity 40 and expandable when the retainer sleeve 70 seats inside lock cavity 40.

Each leg 71a-e may be similarly shaped, with the differences in shape related to the third bend 78 and second extension 97 being included on the first leg 71a. For example, the third leg 71c and the fifth leg 71e can also include a third bend 78 and a second extension 97.

Figure 7:
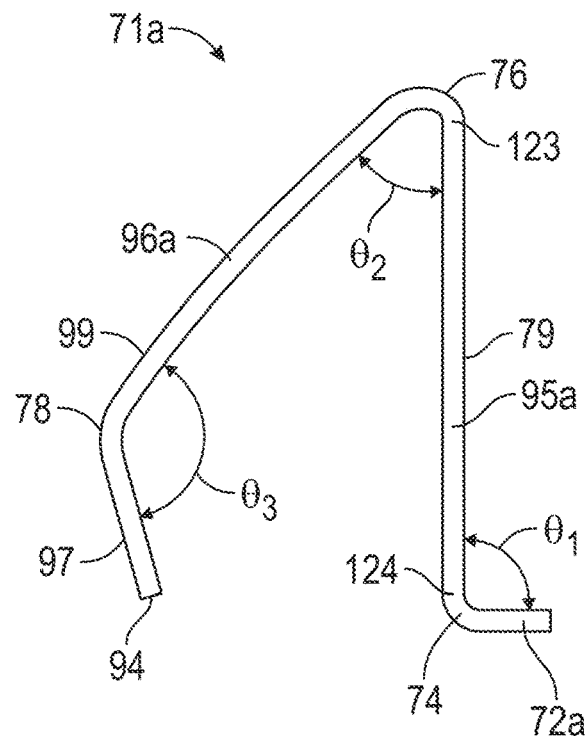
FIG. 7 is a cross section view of the end tab, first plate, and first leg shown in FIG. 6.

FIG. 7 is a cross section view of the end tab 72a, the first plate 95a, and the first leg 71a shown in FIG. 6. The third leg 71c and the fifth leg 71e can be shaped similar to the first leg 71a and the similar features described in connection with the first leg 71a can be used for the features for the third leg 71c and the fifth leg 71e.

The first bend 74 can transition from the end tab 72a to the bottom end 124 of the first plate 95a at an angle $\theta 1$. Angle $\theta 1$ can range from 65 to 90 degrees from the first plate 95a.

The first leg 71a, the third leg 71c, and the fifth leg 71e can include the second bend 76, a first extension 96a, a third bend 78, and a second extension 97.

The second bend 76 can flexibly extend from the top end 123 of the first plate 95a, opposite the first bend 74. The second bend 76 can extend outwards with respect to the retainer axis 75. The second bend 76 can be formed with a constant radius that can range between 0.5 mm and 6.0 mm. The second bend 76 can transition from the first plate 95a to the first extension 96a at an angle $\theta 2$. Angle $\theta 2$ can range from 20 to 50 degrees from the first plate 95a.

The first extension 96a can extend away from the second bend 76 or the first plate 95a and outward from the second bend 76 or first plate 95a with respect to the retainer axis 75. The first extension 96a can taper from wider proximate the second bend 76 or the first plate 95a to narrower opposite the first plate 95a or proximate the third bend 78. For example, the taper may range from 5 to 10 degrees. The first extension 96a may have a curvature of constant radius such as a radius ranging from 60 mm to 65 mm. The first extension 96a may have a concave curvature with respect to the first plate 95a. In another example the first extension 96a can be straight or have varying curvature.

The third bend 78 can flexibly extend from the first extension 96a. The third bend 78 can be formed to transition from oriented outwards to oriented inwards, with respect to the retainer axis 75. The third bend 78 can be formed to have a constant radius that can range between 0.5 mm and 6.0 mm. The third bend 78 can transition from the first extension 96a to the second extension 97 at an angle $\theta 3$. Angle $\theta 3$ can range from 40 to 110 degrees with respect to the first extension 96b.

The second extension 97 can extend downwards and inwards from the third bend 78 with respect to the retainer axis 75. The second extension 97 can extend from the first extension 96a opposite from the first plate 95a. The second extension 97 can have a second extension end 94 opposite the third bend 78 or the first plate 95a. The first extension 96a can taper from wider proximate the third bend 78 or first plate 95a to narrower proximate the second extension end 94.

Figure 8:
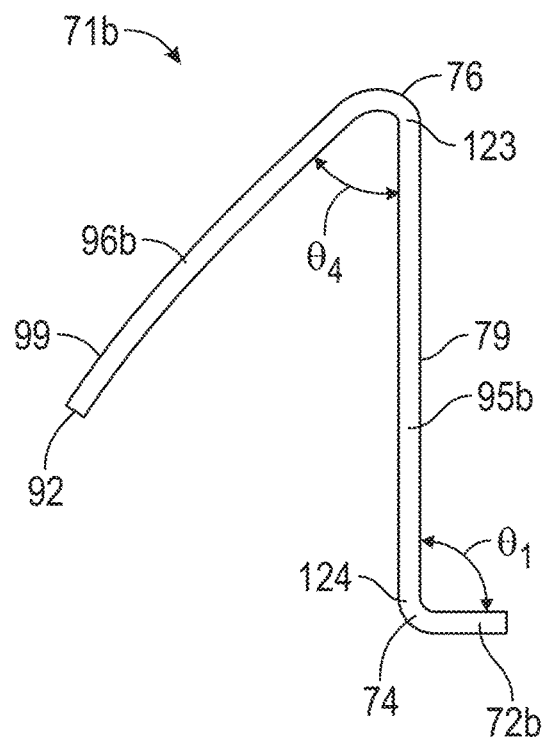
FIG. 8 is a cross section view of the central tab, second plate, and second leg shown in FIG. 6.

FIG. 8 is a cross section view of the central tab 72b, second plate 95b, and the second leg 71b shown in FIG. 6. The fourth leg 71d can be shaped similar to the second leg 71b and the features described in connection with the second leg 71b can be used for the features for the fourth leg 71d.

The first bend 74 can transition from the central tab 72b to the second plate 95b at an angle $\theta 1$. Angle $\theta 1$ can range from 85 to 90 degrees from the second plate 95b.

The second leg 71b and fourth leg 71d can include multiple sections including the second bend 76 and a first extension 96b. The second leg 71b and fourth leg 71d can be shorter than the first leg 71a, third leg 71c, and fifth leg 71e.

In other words, the first leg 71a, third leg 71c, and fifth leg 71e can extend radially further than the second 71b and fourth leg 71d with respect to the retainer axis 75.

The second bend 76 can flexibly extend from the second plate 95b, opposite the first bend 74. The second bend 76 can extend away from the first bend 74 to oriented towards the first bend 74 with respect to along the retainer axis 75 and outwards with respect to the retainer axis 75. The second bend 76 can be formed to with a constant radius that can range between 0.5 mm and 6.0 mm. The second bend 76 can transition from the second plate 95b to the first extension 96b at an angle θ4. Angle θ4 can range from 20 to 50 degrees from the plate 95.

The first extension 96b can extend away from the second bend 76 and outward from the second bend 76 with respect to the retainer axis 75. The first extension 96b can extend from the second plate 95b away from the central tab 72b. The first extension 96b can have a first extension end 92 disposed opposite from the second bend 76 and second plate 95b. The first extension 96b can taper from wider proximate the second bend 76 or second plate 95b to narrower proximate the first extension end 92. For example, the taper may range from 5 to 10 degrees.

Figure 9:
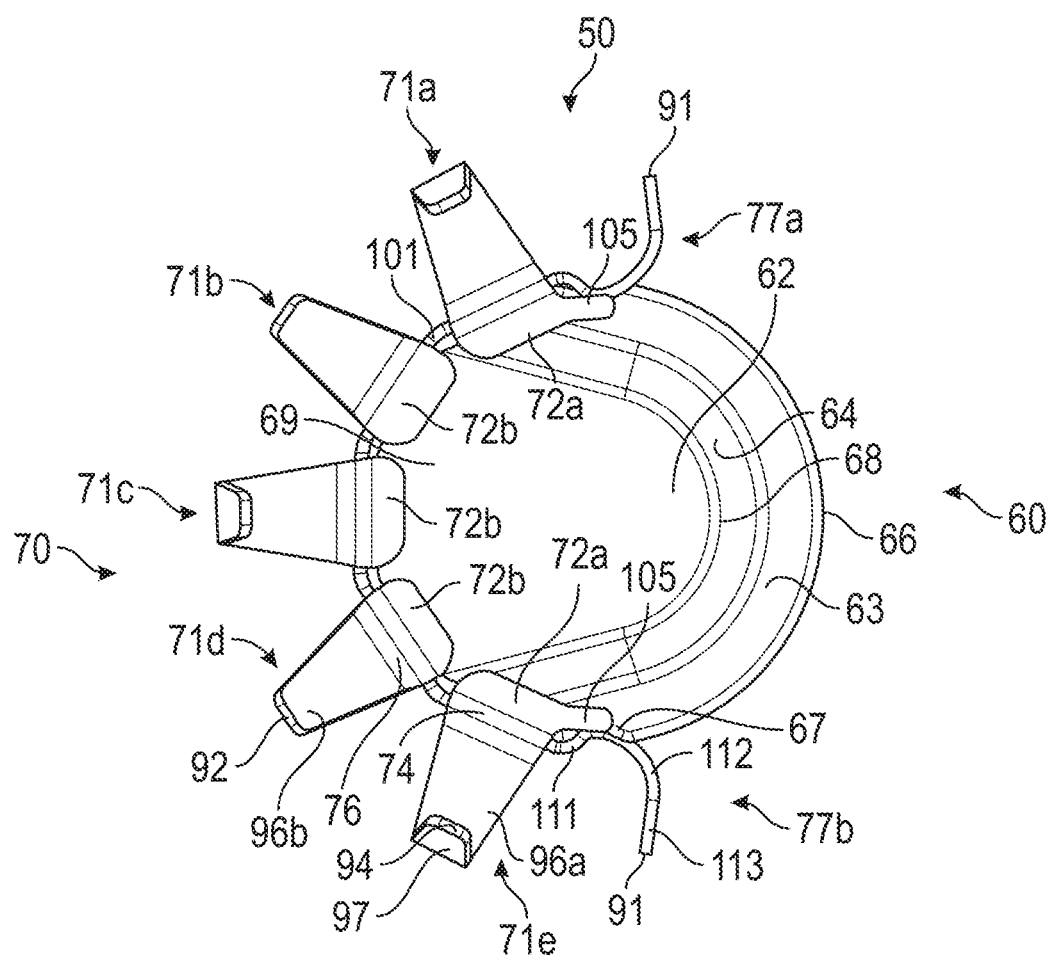
FIG. 9 is a side view illustrating a cooperative arrangement between the lock of FIGS. 4 and 5 and the retainer sleeve of FIG. 6.
Figure 10:
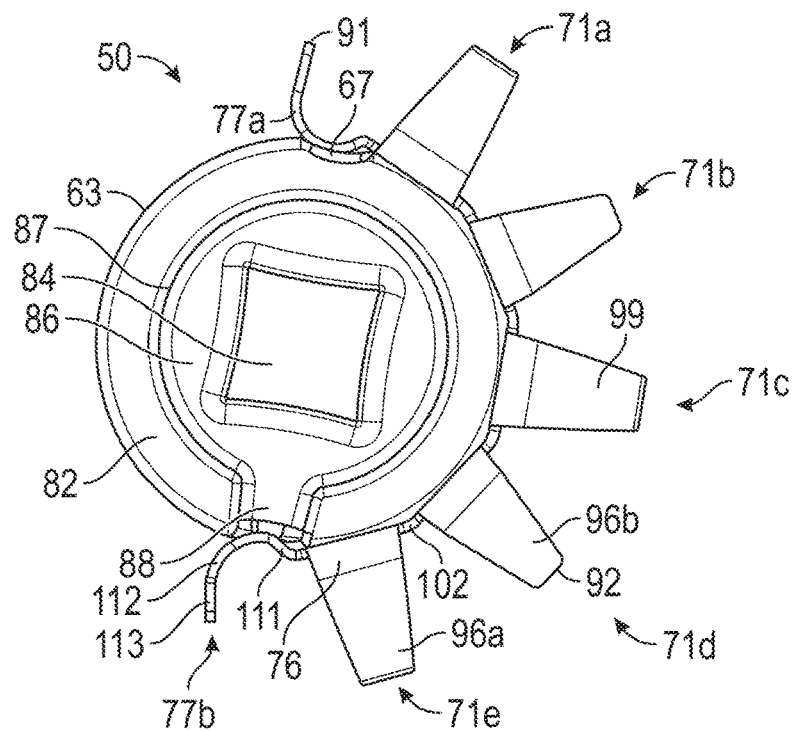
FIG. 10 is an opposite side view illustrating the cooperative arrangement between the lock and the retainer sleeve of FIG. 9.
Figure 11:
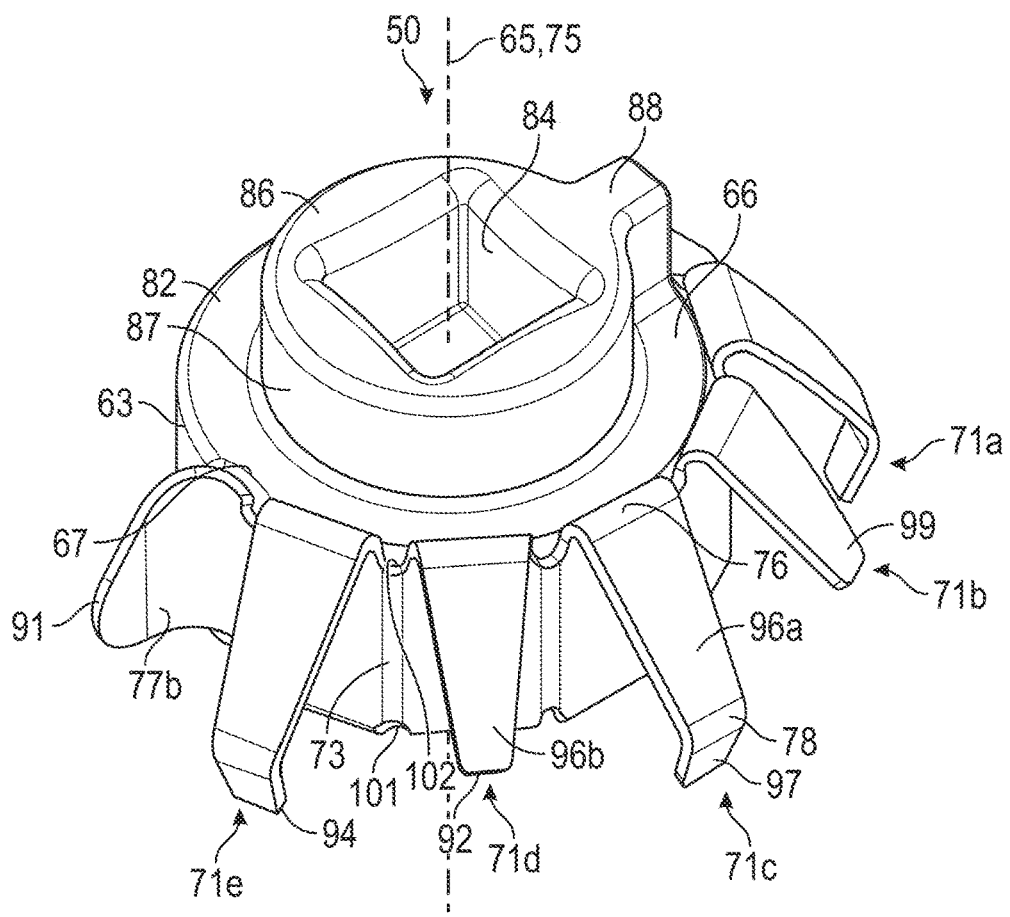
FIG. 11 is a perspective view illustrating the cooperative arrangement between the lock and the retainer sleeve of FIG. 9.

Referring to FIGS. 9-11, retainer sleeve 70 may be formed to mate with inner surface 43 of lock cavity 40. For example, retainer sleeve 70 may include legs 71a-e forming a frustoconical shape formed to mate with a corresponding frustoconical portion of inner surface 43 in lock cavity 40. When retainer sleeve 70 is disposed within lock cavity 40 with legs 71a-e mated to the corresponding frustoconical portion of inner surface 43, retainer axis 75 may coincide with lock rotation axis 65 of lock 60, as shown in FIG. 10.

Lock cavity 40 may be formed such that, when retainer sleeve 70 is seated in lock cavity 40, rotation of retainer sleeve 70 with respect to lock rotation axis 65 is substantially prevented. For example, as best shown in FIG. 2, lock cavity 40 may include a shoulder 48 extending adjacent the circumferential outer ends of inner surface 43 and abutting the detent second portion 112 and detent third portion 113 of detent projections 77a, b.

The skirt 100 can form a continuous inner surface 79 facing towards the retainer axis 75. The inner surface 79 can be formed by the plurality of plates 95a-e and center bend 73. Lock 60 may be formed to mate with inner surface 79 of retainer sleeve 70. For example, as best shown in FIGS. 4 and 5, lock 60 may include a lock skirt 63 with an outer surface 66 having a substantially the same profile as inner surface 79 of retainer sleeve 70. Outer surface 66 of lock skirt 63 may be concentric with and extend circumferentially around lock rotation axis 65. Lock skirt 63 and outer surface 66 may extend only partway around lock rotation axis 65. For example, lock skirt 63 and outer surface 66 may extend around lock rotation axis 65 substantially the same angular degree that skirt 100 of retainer sleeve 70 extends around retainer axis 75. With lock skirt 63 and outer surface 66 of lock 60 so configured, lock 60 may be seated within retainer sleeve 70 with outer surface 66 of lock 60 mated to inner surface 79 of retainer sleeve 70. When lock 60 is so positioned within retainer sleeve 70, lock rotation axis 65 may coincide with retainer axis 75.

Lock 60 may include one or more detent recesses 67 formed to engage corresponding detent projections 77a, b of retainer sleeve 70 to releasably hold lock 60 in predetermined rotational positions about lock rotation axis 65. For example, as shown in FIGS. 4 and 5, detent recess 67 of lock 60 may extend radially inward from outer surface 66 of lock skirt 63. Detent recesses 67 may have a shape formed to mate with the detent second portions 112 of detent projections 77a, b. In the embodiment shown in FIGS. 4 and 5, detent recesses 67 may include a concave surface, such as a constant-radius curved surface, extending radially inward from outer surface 66. In some embodiments, detent recesses 67 may be spaced approximately the same distance from one another as detent projections 77a, b. Thus, where detent projections 77a,b are spaced approximately 180 degrees from one another, detent recesses 67 may likewise be spaced approximately 180 degrees from one another. Accordingly, lock 60 may be positioned in retainer sleeve 70 with outer surface 66 seated against inner surface 79 of retainer sleeve 70 and detent projections 77a,b extending into detent recesses 67. Retainer sleeve 70 may be formed to deflect so as to allow detent projections 77a, b to engage and/or disengage detent recesses 67 of lock 60. For example, retainer sleeve 70 may be constructed at least partially of a flexible material, including but not limited to, a plastic material or an elastomeric material. In some embodiments, retainer sleeve 70 may be constructed wholly of such a flexible material.

According to one exemplary embodiment, retainer sleeve 70 may be constructed of self-lubricating material that may either exude or shed lubricating substance. For example, retainer sleeve 70 may be made of thermoplastic material comprising polyoxymethylene (POM), also known as Delrin®. In further example, the retainer sleeve 70 may be made of metal such as steel. Retainer sleeve 70 made of such material may exhibit low friction while maintaining dimensional stability.

Lock 60 may be constructed of metal. Alternatively or additionally, all or a portion of the surface of lock 60 may be coated with a friction-reducing material. The term "friction-reducing material," as used herein, refers to a material that renders the surface of lock 60 to have a friction coefficient ranging from approximately 0.16 to approximately 0.7. For example, at least a portion of the surface of lock 60 may be plated with zinc to reduce friction on the surface of lock 60 (e.g., surface between lock 60 and retainer sleeve 70) to a friction coefficient between approximately 0.16 to approximately 0.7.

In another exemplary embodiment, at least a portion of the surface of lock 60 may be coated with graphite powder. The graphite powder may be aerosolized and sprayed directly onto the surface of lock 60. Alternatively or additionally, the graphite powder may be mixed with a suitable solvent material and applied to the surface of lock 60 by using a brush or dipping the lock 60 into the mixture. In one exemplary embodiment, a commercially available graphite lubricant, such as the products sold under trademark SLIP Plate, may be used alternatively or additionally.

As mentioned above, lock 60 may be installed with retainer sleeve 70 in lock cavity 40 with outer surface 66 of lock 60 mated to central tab 72b, end tab 72a, and inner surface 79 of skirt 100 and detent recesses 67 of lock 60 mated to detent projections 77a,b of retainer sleeve 70. When lock 60 is disposed in this position, open end 69 of lock slot 62 may face rearward, as shown in FIG. 3. This position allows sliding insertion and removal of post 23 into and out of lock slot 62 through open end 69. Accordingly, this position of lock 60 may be considered an unlocked position.

To lock post 23 inside lock slot 62, lock 60 may be rotated with respect to lock rotation axis 65 to a locked position. In this locked position, the portion of lock skirt 63 adjacent closed end 68 may preclude sliding movement of post 23 relative to lock slot 62, thereby preventing sliding movement of tip 30 relative to adapter 20. The locked position of lock 60 may be approximately 180 degrees from the unlocked position about lock rotation axis 65. In the locked position, as in the unlocked position, detent recesses 67 of lock 60 may engage detent projections 77a, b of retainer sleeve 70, which may releasably hold lock 60 in the locked position.

To rotate lock 60 between the unlocked position and the locked position, sufficient torque may be applied to lock 60 with respect to lock rotation axis 65 to cause detent projections 77a, b and/or detent recesses 67 to deflect and disengage from one another. Once detent projections 77a, b and detent recesses 67 are disengaged from one another, outer surface 66 of lock skirt 63 of lock 60 may slide along inner surface 79 of retainer sleeve 70 as lock 60 rotates around lock rotation axis 65. Once lock 60 rotates approximately 180 degrees around lock rotation axis 65, detent projections 77a,b and detent recesses 67 may reengage one another to releasably hold lock 60 in that rotational position.

Ground engaging tools and the associated retainer systems of the present disclosure are not limited to the exemplary configurations described above. For example, ground engaging tool 10 may include a different number of lock cavities 40, and ground engaging tool 10 may employ a different number and configuration of posts 23, locks 60, and retainer sleeves 70. Additionally, in lieu of adapter 20 and posts 23, ground engaging tool 10 may employ one or more pins fixed to or integrally formed with suitable support structure.

INDUSTRIAL APPLICABILITY

The disclosed retainer systems and ground engaging tools may be applicable to various earth-working machines, such as, for example, excavators, wheel loaders, hydraulic mining shovels, cable shovels, bucket wheels, bulldozers, and draglines. When installed, the disclosed retainer systems and ground engaging tools may protect various implements associated with the earth-working machines against wear in the areas where the most damaging abrasions and impacts occur and, thereby, prolong the useful life of the implements.

The disclosed configurations of various retainer systems and components may provide secure and reliable attachment and detachment of ground engaging tools to various earth-working implements. In particular, certain configurations of the disclosed retainer systems may address certain issues associated with work material getting into the space around the retainer system and increasing friction between components of the retainer system and/or between retainer system and a ground engaging tool. Moreover, certain configurations of the disclosed retainer systems may reduce friction between components of a retainer system and/or between a component of a retainer system and a ground engaging tool. Ground engaging tools may be exposed to a variety of environmental conditions and working material. For example, the working material may comprise slag with high temperatures. The retainers system 50 and its components can comprise of material, such as metal, that can perform and resist high temperatures associated with slag applications.

The disclosed retainer system 50 includes lock 60 and retainer sleeve 70. The legs 71a-e of the retainer sleeve 70 are formed to mate with inner surface 43 of lock cavity 40 of tip 30, and lock 60 is formed to mate with inner surface 79 of retainer sleeve 70. To attach tip 30 to adapter 20, lock 60 and retainer sleeve 70 are assembled into lock cavity 40 of tip 30. Lock cavity 40 opens into side slot 41 that extends rearward, which allows passage of post 23 of adapter 20. Once post 23 is inserted inside lock slot 62, lock 60 is rotated about lock rotation axis 65 to a closed position. In this position, the portion of lock skirt 63 adjacent closed end 68 may preclude sliding frustoconical portion of post 23 into or out of lock slot 62, preventing sliding movement of tip 30 relative to adapter 20. In the locked position, detent recesses 67 of lock 60 may engage detent projections 77a, b of retainer sleeve 70, which may releasably hold lock 60 in the locked position.

To detach tip 30 from adapter 20, lock 60 is rotated from the locked position to an unlocked position to cause detent projections 77a, b and detent recesses 67 to disengage from one another. Once detent projections 77a, b and detent recesses 67 are disengaged from one another, outer surface 66 of lock skirt 63 of lock 60 may slide along inner surface 79 of retainer sleeve 70, as lock 60 rotates around lock rotation axis 65. Once lock 60 rotates approximately 180 degrees around lock rotation axis 65, detent projections 77a,b and detent recesses 67 may reengage one another to releasably hold lock 60 in that rotational position.

The continuous C shape of the skirt 100 can improve overall structure of the retainer sleeve 70, making the sleeve less flexible and allowing for a tighter fit of the retainer sleeve 70 around the lock 60. The legs 71a-e can vary in length and can alternate between legs 71a, 71c, 71e with the third bend 78 and second extension 97 and legs 71b, 71d without the third bend 78 and second extension 97 to facilitate engagement to the lock cavity 40 and to prevent the lock 60 from falling out of position during use. The detent projections 77a, b can mate with the detent recesses 67 as well as engage the shoulder 48 of the lock cavity 40 to prevent rotation of the lock 60 during use. For example the detent second portion 112 and detent third portion can engage with the shoulder 48.

The first bend 74, second bend 76, first extension 96a, 96b, and third bend 78 are formed to provide flexibility and a spring like effect to the skirt 100 and the legs 71a-e to help accommodate variances in the lock 60 and lock cavity 40 dimensions. The form of the legs 71a-e can produce a compressive force against the lock cavity 40 to hold the lock 60 in place. The spring like form of the retainer sleeve 70 can facilitate install in the lock cavity 40.

During manufacturing, the lock cavity 40 can be made slightly larger or smaller in comparison to the design dimensions. In a least material condition (LMC) of the lock cavity 40, the legs 71a-e can be pre-formed in anticipation for a LMC and can provide a tight fit with the inner surface 43 of the lock cavity 40. In a maximum material condition (MMC) of the lock cavity 40, the legs 71a-e can compress, via flexing in the first bend 74, second bend 76, and third bend 78, towards the retainer axis 75 to accommodate a tighter fit. The tight fit keeps the lock 60 and the retainer sleeve 70 concentric and in the proper position.

Similarly, in a LMC of the lock 60, the first bends 74 and the plurality of plates 95a-e of the skirt 100 can be pre-formed in anticipation for a LMC and can provide a tight fit with the inner surface 43 of the lock cavity 40. In a MMC of the lock 60, the plurality of the plates 95a-e can expand outwards, via flexing in the first bend 74, away from the retainer axis 75 to accommodate a tighter fit. The tight fit can prevent the lock 60 from rotating to an unlocked position.

The first bends 74 can be formed and flexed to encourage the plurality of plates 95a-e and center bends 73 to induce a compressive force against the outer surface 66. The second bend 76 can be formed and flexed to encourage the first extension 96a, 96b, the first extension end 92, and the third bend 78 to induce a compressive force against the inner surface 43 of the lock cavity 40 that can keep the retainer sleeve 70 centered about the lock rotation axis 65. The third bend 78 can be formed and flexed to encourage the second extension 97 to induce a compressive force against the inner surface 43 of the lock cavity 40 to prevent the retainer sleeve 70 and lock 60 from shifting positions or falling out during use. The first extension end 92 of the second leg 71b and fourth leg 71d can provide an outer edge that facilitates contacting and catching onto the inner surface of the lock cavity 40 to prevent the retainer sleeve 70 and lock 60 from shifting positions or from falling out during use.

The first extension 96a, 96b can be formed with concaved curvature with respect to the plurality of plates 95a-e to promote gradual bending from the outward portion of the legs 71a-e when under compressive load in comparison to bending only at the second bend 76. The first extensions 96a, 96b can further be shaped with a taper that is wider proximate the second bend 76 than opposite the second bend 76 that can promote a gradual bending from the outward portion of the legs 71a, 71b, 71c, 71d, 71e.

The lower recess 101, the upper recess 102, and the detent recess 104 can help provide stress relief during the manufacture and forming process of the retention sleeve 70.

Although this invention has been shown and described with respect to detailed embodiments and examples thereof, it will be understood by those skilled in the art that various changes in form and detail thereof may be made without departing from the spirit and scope of the claimed invention. Accordingly, the preceding detailed description is merely exemplary in nature and is not intended to limit the invention or the application and uses of the invention. In particular, the described embodiments are not limited to use in conjunction with a particular type of earth working machine. Furthermore, there is no intention to be bound by any theory presented in any preceding section. It is also understood that the illustrations may include exaggerated dimensions and graphical representation to better illustrate the referenced items shown, and are not consider limiting unless expressly stated as such.

It will be understood that the benefits and advantages described above may relate to one embodiment or may relate to several embodiments. It is appreciated that features shown or discussed in one embodiment or example can be combined with other features shown or discussed in other embodiments and examples. The embodiments are not limited to those that solve any or all of the stated problems or those that have any or all of the stated benefits and advantages.

What is claimed is:

1. A retainer sleeve for use with a lock in a ground engaging tool with a lock cavity, the lock having an outer surface and a detent recess, the retainer sleeve comprising:
    a skirt extending part way around a retainer axis and forming an inner surface shaped to rotatably receive the outer surface of the lock, the skirt having
        a first plate,
        a second plate located proximate to the first plate,
        a center bend circumferentially extending between the first plate and the second plate with respect to the retainer axis,
        a first leg joined to the first plate, extending away from the retainer axis, and formed to mate with the lock cavity of the ground engaging tool, and
        a second leg shorter than the first leg, and joined to the second plate, extending away from the retainer axis, and formed to mate with the lock cavity of the ground engaging tool.

2. The retainer sleeve of claim 1, wherein the first leg comprises a first extension extending outward from the first plate with respect to the retainer axis.

3. The retainer sleeve of claim 2, wherein the first extension tapers from wider proximate the first plate than opposite the first plate.

4. The retainer sleeve of claim 1, wherein the skirt comprises a detent projection extending from the first plate, formed to engage the detent recess of the lock to releasably hold the lock and formed to engage a shoulder of the lock cavity.

5. The retainer sleeve of claim 1, wherein the skirt is formed as a "C" shape.

6. The retainer sleeve of claim 1, wherein the skirt extends more than 180 degrees around the retainer axis.

7. A retainer sleeve for use with a lock in a ground engaging tool, the retainer sleeve comprising:
    a plurality of plates arranged in a generally "C" shape, each of the plurality of plates having
        a first side,
        a second side opposite the first side,
        a top end, and
        a bottom end opposite the top end;
    a plurality of center bends, each of the plurality of center bends extending from the first side of one of the plurality of plates to a second side of another of the plurality of plates which is adjacent;
    a central tab extending from proximate the bottom end of at least one of the plurality of plates in a direction generally toward the center of the "C" shape; and
    a leg joined to the top end of at least one of the plurality of plates, the leg extending away from the at least one plate and from the central tab.

8. The retainer sleeve of claim 7, wherein the leg comprises a first extension extending outward from at least one of the plurality of plates.

9. The retainer sleeve of claim 8, wherein the first extension tapers from wider proximate the top end than opposite the top end.

10. The retainer sleeve of claim 8, wherein the leg comprises a second extension extending from the first extension.

11. The retainer sleeve of claim 8, wherein the retainer sleeve comprises a first bend that is formed to bend to encourage the positioning of the plurality of the plates such that the plurality of the plates induces a compressive force with an outer surface of the lock.

12. The retainer sleeve of claim 7, wherein the retainer sleeve comprises a detent projection extending from the second side of at least one of the plurality of plates which is not adjacent to two plates of the plurality of plates, formed to engage a detent recess of the lock to releasably hold the lock.

13. The retainer sleeve of claim 12, wherein the detent projection extends radially inward as a convex surface, with respect to the skirt.

14. The retainer sleeve of claim 8, wherein the leg includes a second bend joining at least one of the plurality of plates to the first extension, the second bend formed to bend to encourage the first extension to induce a compressive force against an inner surface of the lock cavity.

15. The retainer sleeve of claim 7, wherein the plurality of plates includes a third plate, a fourth plate, and a fifth plate.

16. A retainer system for a ground engaging tool, comprising:
a lock including:
a head portion having a tool interface;
a lock skirt extending from the head portion and including an outer surface; and
a detent recess formed on the outer surface of the lock skirt; and
a retainer sleeve including
a skirt extending part way around a retainer axis, and having
a first plate, the first plate having
a first side,
a second side opposite the first side,
a top end, and
a bottom end opposite the top end, and
a second plate, the second plate having,
a first side joined to the second side of the first plate,
a second side opposite the first side of the second plate,
a top end, and
a bottom end opposite the top end, and
a center bend extending from the second side of the first plate to the first side of the second plate;
an end tab extending from the bottom end of the first plate towards the retainer axis; and
a first leg extending from the top end of the first plate away from the retainer axis, the first leg positioned opposite from the end tab.

17. The retainer sleeve of claim 16, wherein the first leg comprises a second bend flexibly joins the top end of the first plate to the first extension, the second bend extending outward with respect to the retainer axis.

18. The retainer sleeve of claim 16, wherein the first extension is shaped with a curvature of constant radius.

19. The retainer sleeve of claim 16, wherein the first extension comprises a first extension end, located opposite the second bend, and formed to contact an inner surface of a lock cavity of the ground engaging tool.

20. The retainer system of claim 16, wherein the skirt forms an inner surface shaped to rotatably receive the outer surface of the lock.

* * * * *